Patented Feb. 26, 1935

1,992,673

UNITED STATES PATENT OFFICE 1,992,673

NUTRITIONAL IODINE

Edgar V. Moorman, Chicago, Ill., assignor to Moorman Manufacturing Company, Chicago, Ill., a corporation of Illinois No Drawing. Application April 10, 1933,
Serial No. 665,340

2 Claims. (Cl. 99—11)

The present invention relates to the use of iodine as a nutritional element for food products, and has particular reference to an improved iodine product and means for administering the same to the animal system in such a manner that the iodine is made available as a nutritive element without having a deleterious action upon the body tissues of the animal consuming the same.

It has been recognized for a long time that iodine plays an important part in the composition of an animal body. In certain localities where there is an absence of natural iodine in products consumed as food there is a noticeable increase in goitre and other glandular troubles which are of serious consequence. This is true in the case of livestock as well as human beings. So important is the problem that it is customary to supply iodine to the diet in order to insure an adequate supply thereof to the animal system. This iodine heretofore has been added in the form of iodine salts, such as potassium iodide. Iodine salts are generally quite soluble in water and when the potassium iodide or other salt is added as a constituent of food products, the iodine will be dissipated and otherwise affected by wetting or unduly moist conditions. Also, the potassium iodide has other disadvantages, such as settling out of a mixture of food products and of being difficult of even dissemination, due at least in part to the small quantity or bulk of the iodine salt which is employed.

A primary object of the present invention is the production of a stable and homogeneous iodine-containing animal feed.

An additional object is the incorporation of elementary iodine in animal feed in such a way that deterioration does not result.

A further object is the provision of an animal feed in which a relatively small quantity of iodine is absorbed in a larger quantity of carbon and the latter is distributed in a feed product, thereby providing for the ready and thorough distribution of the iodine in the food product.

Another object is the preparation of animal feed having dispersed therein a carbonaceous material containing adsorbed iodine.

Still another object is the production of an animal feed contaiing elementary iodine in such proportions as to be available as a nutritive element of the food product without having a deleterious action upon the animal system.

These and other objects will be apparent from the following illustrative and explanative description.

In the production of many animal feeds it is customary to add carbonaceous materials of one type or another for various purposes. For example, charcoal and activated carbon are often added. In the same foods iodine compounds have often been added in amounts sufficient to form a nutritive element in the food product. In accordance with my invention, there is employed in the animal food a carbonaceous material carrying an absorbed charge of elementary iodine.

It has been known in the art that carbon has the capacity of absorbing elementary iodine from an aqueous solution. The bond between the iodine and carbon is quite strong and in order to liberate or recover the iodine from the carbon such methods as treatment with strong alkali and burning of the carbon have been employed. By extensive tests in which carbon containing adsorbed iodine was mixed in nutritive proportions in animal foods I have found that, for some unknown reason, the iodine becomes available to the blood stream in the animal system.

It has been suggested heretofore to employ a carbon containing an absorbed charge of iodine as a vermifuge, but it has not been known prior to my research and experiments that iodine contained in carbon will be made available as a nutritive element in the digestive system of an animal, when employed in much less concentration than is necessary for a vermifuge dosage. In such prior uses the carbon carrying an adsorbed charge of iodine was not used as a component of an animal feed mixture, nor for nutritive purposes. More particularly, the material was known and used as a poison for animal parasites such as nematodes, rather than as a nutrient for animals.

Other methods than the use of iodized carbon are known for utilizing iodine as a vermifuge, and in all such uses as a vermifuge the iodine will cause serious injury to body tissue and even kill the animal to which it is given if employed as a constant diet in the manner of a nutritional element. That is, strong or concentrated iodine has the quality of acting as a deleterious element or poison to the animal system as well as to the worms which the iodine is used to destroy.

In accordance with my invention, the iodized carbon is mixed as a constituent of food products in quantities which provide an iodine content of the order of 0.015 per cent by weight of the total.

In one application of the invention the iodized carbon will be added to food for livestock and poultry. There are two principal classes of prepared foods for livestock, namely, mixed feeds and mineral feeds. The mixed feeds may be composed of mixtures of chops, bran, maize and various grain or other vegetable or animal products to form rations properly balanced as to their organic content. With these mixed feeds may be incorporated other ingredients of organic or mineral character. It is preferred to introduce the iodized carbon in proper amounts with the feed during or prior to the mixing thereof so that an even distribution or dispersion is assured. Mineral feeds are ordinarily molded into blocks which contain a number of special ingredients for the livestock diet, including bone black, charcoal, activated carbon or other carbonaceous materials, granular to powdered, copperas, bicarbonate of soda, lime phosphate, limestone, salt, steamed bone char, sulphur, tobacco, molasses or hydro, paraffin and potassium iodide. The ingredients are varied over a wide range, as is well understood in the art, to suit individual needs. In some instances the mineral feed is not compressed in blocks. However, in any case, in accordance with my invention, there is mixed with the mineral feed an amount of carbon containing an adsorbed charge of iodine in sufficient quantity to supply the dietary needs of the food product, but in insufficient quantities to have a deleterious action upon the body tissue of the animal consuming the food. It is, therefore, possible to employ the material as a constant element of the diet with beneficial, rather than injurious, effects on the health of the animal.

I have found that when mixed in the small proportions sufficient for dietary needs, the iodine adsorbed in the carbon is made available in the digestive tract. Furthermore, it appears from extensive tests over a period of time that the iodine in the form described has a more beneficial effect upon the animal system than does iodine in the ordinary form, such as potassium iodide. I am unable to account for this fact without resorting to theory but it is possible that the increased availability in the animal system is due to the fact that iodine in an elemental form has a more complete reaction into the form in which it is adsorbed by the blood than in the case of an iodine compound, the formation from which, of compounds that will be adsorbed by the blood, perhaps depending upon the law of mass action. However, regardless of theory, it remains a fact as proven by my experimental feeding of animals that the iodized carbon when it is mixed in food in nutritive quantities is a particularly desirable form in which to administer the iodine.

When mixed with the ingredients of mineral feed the iodized carbon is of particular advantage. For instance, it is often desirable to place mineral feed out in the open where it is in easy access to livestock. In this case, it will be seen that the feed is subject to adverse weather conditions, including rain, dew, sunlight and relatively high temperatures. Even under such adverse conditions I have found that the iodine will be held in the feed and that the quantity thereof will not decrease, as would be expected, and as is the case where iodine compounds such as potassium iodide are employed. Considerable difficulty has been encountered heretofore in the loss of iodine content from feed blocks. Although an adequate quantity of iodine compounds may be added to the feed at the manufacturing plant, by the time the feed is used by the consumer the iodine content may be considerably lower than as advertised in the sale of the product.

In one embodiment of my invention the iodized carbon is mixed with mineral feed in nutritive quantities and the feed is pressed into blocks which have been found to withstand adverse conditions for extended periods without loss of iodine. I have also found it of great advantage to employ the iodized carbon in connection with salt, instead of the potassium iodide customarily used heretofore, and the salt may be fed in the form of blocks or in ordinary condition. When iodine compounds are employed, as has been customary heretofore, it is impossible to maintain the iodine content of the feed constant, but in accordance with my invention elementary iodine itself is employed in the feed and this quantity remains constant over extended periods of time and under adverse conditions.

In the case of poultry foods, it may be desirable to employ carbon in a granular form, which the poultry will eat as grit, thereby receiving, in nutritive quantities, an effective form of iodine. It will be understood that the material may be mixed with other poultry foods in the usual manner, as described with respect to animal foods in general.

The use of iodized carbon in nutritive quantities is not confined to livestock and poultry, but may be employed in foods for human consumption. For instance, the iodized carbon may be placed in cereal products, vegetables, or the like, it being necessary to employ the iodine in nutritive quantities.

The carbonaceous material which I may use to adsorb the iodine necessary for use as a nutritive factor in the animal diet may be charcoal, activated carbon or other adsorptive form of carbon. It will be understood that the concentration of the iodine in the food product may be varied considerably while still maintaining a sufficiently low concentration to prevent injurious action upon the internal organs of an animal to which the material is fed. As stated hereinbefore, this content may be of the order of 0.015 per cent based on the weight of the food product but I do not wish to be limited to this exact proportion since when used in smaller quantities the iodine is still of nutritive value and when used in larger quantities the iodine functions as a nutritive element in the diet, the upper limit of the concentration being that at which the iodine has a deleterious effect on animal tissue.

Where an iodine compound is added directly to a feed product, the relatively small quantity of the iodine compound, as compared with the bulk of the feed mixture, makes the even distribution of the iodine in the feed particularly difficult. By adsorbing elementary iodine in carbon, the bulk of the iodine-containing material is considerably increased, and I have found that distribution of the iodine in the feed mixture is greatly facilitated thereby.

Modification of my invention is possible, and all variations coming within the spirit of the invention are intended to be included in the appended claims.

I claim:

1. The method of producing an animal feed having a small and nutritional quantity of iodine substantially uniformly distributed therein and capable of retaining said iodine therein in stable condition, which comprises providing a large quantity of feed ingredients, providing a small quantity of elementary iodine, adsorbing said iodine in a larger quantity of carbon to form iodized-carbon, and mixing said iodized-carbon with said feed ingredients until a substantially homogeneous mixture of said iodized-carbon and feed ingredients is obtained.

2. An animal feed product containing a small and nutritional quantity of iodine uniformly dispersed therein in stable condition, comprising a large quantity of feed ingredients having uniformly distributed therein a quantity of carbon carrying a small and nutritional charge of adsorbed iodine, the latter being in stable and substantially evenly dispersed condition in said feed ingredients.

EDGAR V. MOORMAN.